June 28, 1955  P. R. GRANTS  2,711,761
POWER-DRIVEN ENDLESS SAW

Filed Jan. 9, 1952  2 Sheets-Sheet 1

Paul R. Grants
INVENTOR.

BY *Clarence A. O'Brien*
*and Harvey B. Jackson*
Attorneys

June 28, 1955  P. R. GRANTS  2,711,761
POWER-DRIVEN ENDLESS SAW
Filed Jan. 9, 1952 2 Sheets-Sheet 2
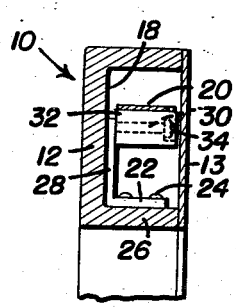
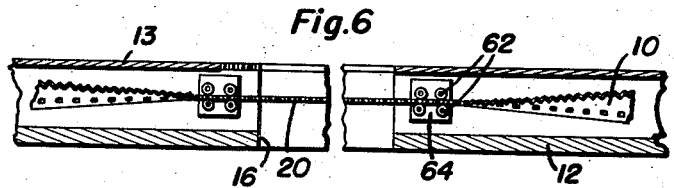
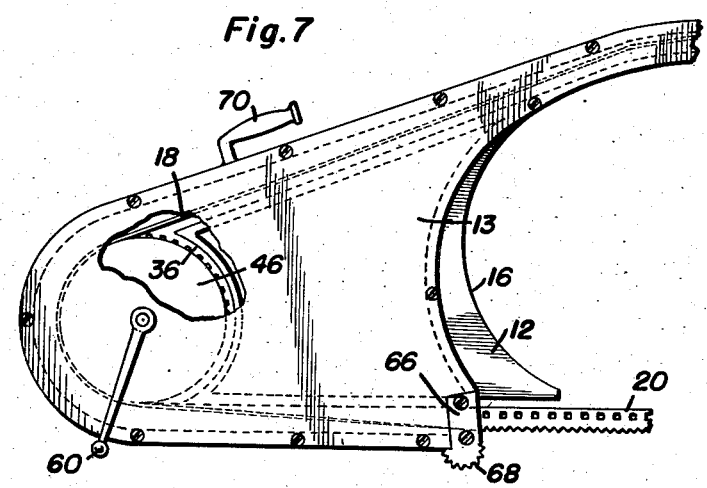
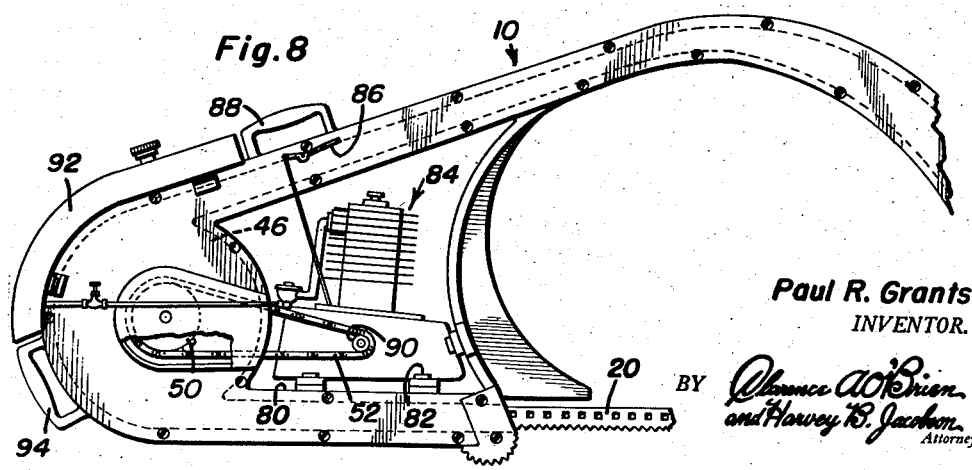
Paul R. Grants
INVENTOR.

United States Patent Office 2,711,761
Patented June 28, 1955

2,711,761

POWER-DRIVEN ENDLESS SAW

Paul R. Grants, Montreal, Quebec, Canada

Application January 9, 1952, Serial No. 265,630

3 Claims. (Cl. 143—17)

This invention comprises novel and useful improvements in power-driven saws and more specifically has reference to a power-operated portable saw of the endless band or chain saw type.

This application represents an improvement over my prior copending application, Serial No. 115,891, filed September 15, 1949, for Saw, and now abandoned.

The primary object of this invention is to provide an improved construction of band or chain saw which may be portable in nature, may be readily manually operated, and wherein the driving mechanism thereof may be greatly improved in its construction and operation and may be housed in an improved manner in the structure of the saw.

A further and more specific object of the invention is to provide an improved portable power-operated saw wherein a portable power plant, such as an internal combustion engine, may be mounted and housed in the framework of the saw in an improved manner and may be operatively connected with the endless saw blade for improved operation thereof.

The foregoing objects of the invention are realized by the present device, a preferred embodiment of which has been illustrated, by way of example only, in the accompanying drawings, wherein:

Figure 5 is a vertical transverse sectional detail view taken upon an enlarged scale substantially upon the plane indicated by the section line 5—5 of Figure 2, the view illustrating one of the support brackets upon which the endless saw blade is rotatably mounted;

Figure 6 is a fragmentary sectional detail view of a portion of the apparatus showing the manner in which the flexible endless saw blade is guided and journaled for passage across an opening in the frame of the saw;

Figure 7 is an enlarged elevational detail view of a portion of the saw, parts being broken away; and Figure 8 is a fragmentary enlarged elevational detail view somewhat similar to Figure 7 but showing the manner in which an internal combustion engine is mounted in the framework of the saw to constitute a power-operating means for the same.

Figure 1:
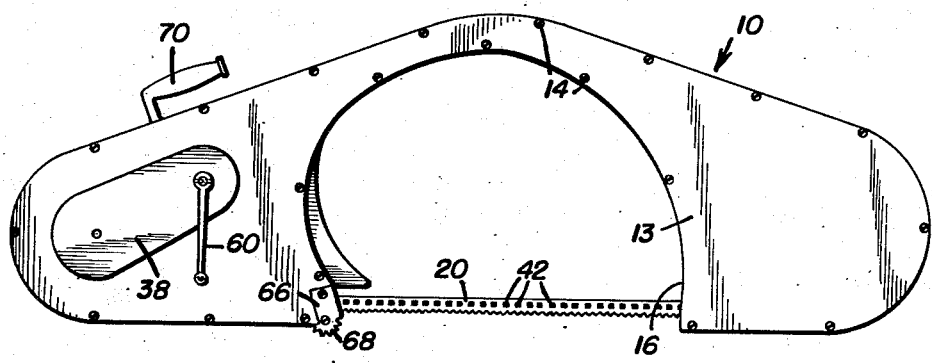
Figure 1 is a side elevational view showing a suitable and preferred embodiment of the saw incorporating therein the principles of this invention.

Referring now more specifically to the accompanying drawings, wherein like numerals designate similar parts throughout the various views, it will be seen that the principles of the invention are adapted for use with a hand-operated saw, as shown in Figures 1–7, and are equally adapted for use with a power-operated saw, as shown in Figure 8. Except for the substitution of manual operating means for power operating means, and vice versa, the construction of saw of these two embodiments is substantially identical and therefore a description of the frame construction, saw blade mounting means and driving mechanism of Figure 1 will suffice for the construction of Figure 8.

The novel saw apparatus in accordance with this invention consists of a supporting frame indicated generally by the numeral 10, which frame, as will be more readily apparent from Figures 3–6, includes a relatively flat plate-like member 12 of suitable shape, size and material, and which, in one side, is provided with appropriate chambers, compartments and recesses as set forth hereinafter, these being closed by a removable cover plate 13 of a shape and size which is complemental to that of the member 12, the cover plate being removably retained thereon, as by fastening screws or bolts 14.

Intermediate its ends, the frame 10 is provided with an appropriately shaped opening 16, and it is between the adjacent ends of this opening that the sawing member of the apparatus is exposed and rendered effective.

Disposed upon that face of the member 12 upon which the cover plate 13 is mounted is a channel 18 disposed adjacent the periphery of the saw frame and extending thereabout. This channel is enclosed or covered by the above-mentioned cover plate 13, and thus constitutes a passageway in which is mounted a flexible endless saw blade 20 of any desired construction.

Figure 2:
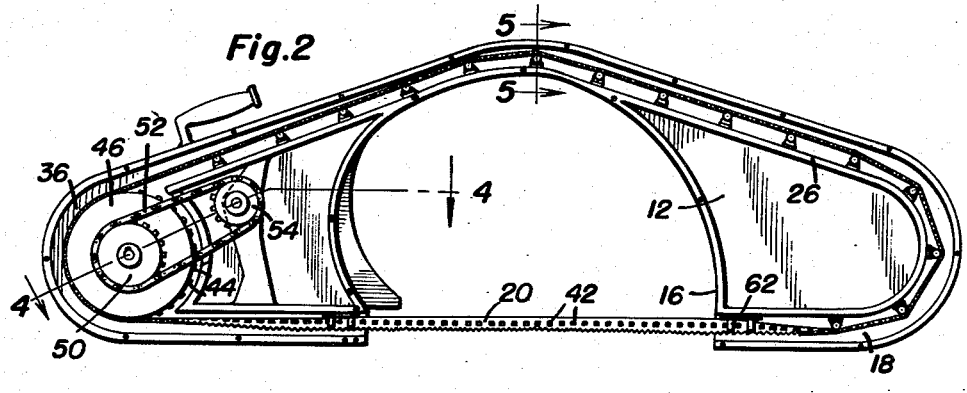
Figure 2 is a view similar to Figure 1 but showing the cover plate removed from the frame and housing of the saw.
Figure 3:
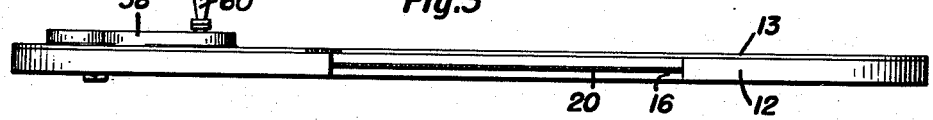
Figure 3 is a bottom plan view of the saw of Figures 1 and 2.
Figure 4:
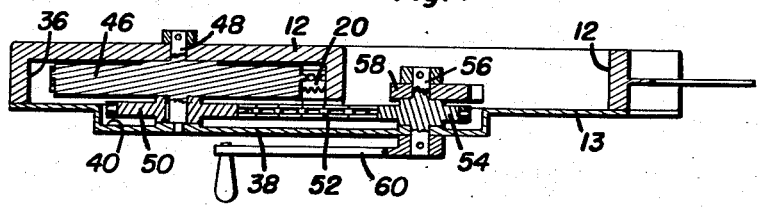
Figure 4 is a horizontal sectional detail view, taken upon an enlarged scale substantially upon the plane indicated by the broken section line 4—4 of Figure 2.

Referring especially to Figures 2 and 5, it will be apparent that there are provided a number of supporting brackets within the channel 18 for rotatably supporting the flexible endless saw blade. These supporting brackets may conveniently comprise L-shaped members having each a foot portion 22 secured, as by rivets or supporting screws 24, to the inner wall 26 of the channel 18, and having perpendicularly disposed members 28 resting against the bottom wall of the channels. At their upper ends, the members 28 are provided with axles 30 upon which are secured cylindrical rollers 32, the latter being removably secured upon the axles as by fastening nuts 34, these rollers supporting the above-mentioned flexible saw blade.

It will thus be seen that the endless flexible saw blade is rotatably journaled within the channel 18 in the frame of the saw which constitutes a housing for the saw blade, and access may be had to this channel by removing the cover plate 13 for inspecting the saw blade or its supporting brackets; removing and servicing the saw blade or replacing the same as desired or found to be necessary.

At one end, the member 12 of the saw frame 10 is provided with an annular chamber 36 which is tangentially intersected by the above-mentioned channel 18, as will be clearly apparent from Figure 2. The cover plate 13 above mentioned is provided with a laterally offset portion 38 which overlies the central portion of the chamber 36 and extends inwardly of the saw frame therefrom for a purpose which will later be set forth. This laterally offset portion 38 constitutes or defines upon the inner side of the cover plate a compartment 40 which registers with and extends from the above-mentioned chamber 36.

As will be better apparent from Figure 2, the endless flexible saw blade is provided with a plurality of longitudinally spaced apertures 42 which are adapted to be successively engaged by the driving teeth 44 of a driving cog wheel 46, the latter being either integrally or rigidly secured upon an axle 48 whose opposite extremities are journaled in the walls of the member 12 and of the lateral offset portion 38 of the cover plate 13. Likewise integrally or rigidly mounted upon the drive axle 48 is a drive sprocket 50 over which is entrained a sprocket chain 52 which extends through and is housed in the compartment 40. At the other end of the compartment 40, the sprocket chain 52 is entrained over a drive means 54 comprising a sprocket gear which is mounted upon or integrally secured to an axle 56 which is journaled in the wall of the compartment 40 in the cover projection 38, and in a suitable supporting lug 58 carried by the saw frame member 12. Extending outwardly of the cover portion 38, the axle 56 has secured thereto a hand crank 60 whereby the flexible saw blade 20 may be rotated.

It will be observed that the major portion of the saw blade rests upon one side on the journaling rollers 32, as shown in Figures 2 and 5, so that the major portion of the blade is perpendicular to the side of the frame member 12. However, that portion of the saw blade which extends across the opening 16 is positioned in a plane which is parallel to the plane of the plate-like member 12, and for this purpose, as shown best in Figure 6, driving means are provided consisting of suitable pairs of guiding rollers 62 mounted upon suitable supporting brackets 64 which are housed within the channel 18 adjacent the two sides of the opening 16.

Adjacent one side of the opening 16, is an anchoring lug 66 having a curved toothed portion 68. This anchoring lug with its toothed portion is adapted to engage in a log or the like to thereby support and position the saw as the latter cuts through the log.

Disposed conveniently upon the periphery of the saw frame, and preferably adjacent that end of the frame which has the manual handle 60, is a hand grip member 70 to assist in positioning, carrying and manipulating the saw.

From the foregoing, it will be apparent that when the saw is once positioned and held in place by the anchoring engagement of the lug 66 and by the hand grip 70, that the saw may be rotated by manually turning the handle 60, which in turn, through the sprocket chain 52 and the sprocket gears 54 and 50, will cause rotation of the driving cog wheel 46 to thus rotate the saw blade.

The above described principles of construction and operation of the invention may likewise be utilized in the power operated arrangement of Figure 8. In this arrangement, the saw frame 10 and the flexible endless saw blade 20 are constructed and arranged as previously described. However, the sprocket chain 52 which is connected to the sprocket gear 50 for operating the saw driving cog wheel 46, instead of being connected to a hand crank, is connected to a source of power. For this purpose, the saw frame 10 is provided with a cut away portion 80 therethrough in which is removably mounted, as by securing bolts 82, a portable light weight internal combustion engine indicated generally by the numeral 84. This engine may be of any conventional and known design, and may conveniently be of a light weight construction of about one-quarter of a horsepower. Since this engine may be of any conventional and known design and may be purchased upon the open market, a recitation of the structural details of the same appears to be unnecessary. However, the power of the engine may be readily controlled by a carburetor throttle lever 86 suitably mounted upon the frame of the saw and adjacent a hand grip member 88 disposed upon the periphery of this saw frame. The power shaft of the engine is connected to the chain 52 through the driving sprocket gear 90.

It will be particularly noted that in the arrangement of Figure 8 wherein the power plant 84 is mounted in the frame of the saw, the cut away portion of the latter provides for free access of the atmosphere to the power plant for cooling the same. Also, the power plant is readily accessible for servicing, adjustment or repairs as desired.

In the arrangement of Figure 8, the fuel tank 92 of the engine is curved to conform to closely overlie the periphery and end portion of the frame of the saw, and to partially envelop and surround the wall of the chamber 36 and the cog wheel 46 therein. A further hand grip member 94 may be disposed on the other side of the arcuate fuel tank 92 from the hand grip 88. The two hand grips thus serve to assist in positioning or maneuvering the saw, and further constitute means for protecting the ends of the fuel tank 92 against damage.

It will be readily appreciated that instead of the internal combustion engine 84 any other suitable source of power, such as an electric motor or the like, may likewise be utilized.

Since, from the foregoing, the construction and advantage of this power-driven endless saw are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having thus described the invention, what is claimed as new is:

1. A saw comprising an enclosed frame having a peripheral guideway formed therein, a drive wheel disposed in one end of said frame in alignment with said guideway, an endless flexible saw blade disposed in said guideway and entrained over said drive wheel, said frame having a first opening for exposing a section of said saw blade, a second opening in said frame between said first opening and said drive wheel, a prime mover mounted within said second opening and drivingly connected to said drive wheel, a handle for the saw projecting upwardly from said frame above said prime mover, said handle having associated therewith throttle control means for said prime mover to control operation of said saw blade, said prime mover being an internal combustion engine, an arcuate fuel tank for said engine carried by said frame adjacent said handle, said fuel tank following the general contour of said frame and partially enveloping said drive wheel.

2. A saw comprising an enclosed frame having a peripheral guideway formed therein, a drive wheel disposed in one end of said frame in alignment with said guideway, an endless flexible saw blade disposed in said guideway and entrained over said drive wheel, said frame having a first opening for exposing a section of said saw blade, a second opening in said frame between said first opening and said drive wheel, a prime mover mounted within said second opening and drivingly connected to said drive wheel, a handle for the saw projecting upwardly from said frame above said prime mover, said handle having associated therewith throttle control means for said prime mover to control operation of said saw blade, said prime mover being an internal combustion engine, an arcuate fuel tank for said engine carried by said frame adjacent said handle, said fuel tank following the general contour of said frame and partially enveloping said drive wheel, a second handle carried by said frame adjacent a lower end of said fuel tank, said handles forming guards for ends of said fuel tank.

3. A saw comprising an enclosed frame having a peripheral guideway formed therein, a drive wheel disposed in one end of said frame in alignment with said guideway, an endless flexible saw blade disposed in said guideway and entrained over said drive wheel, said frame having a first opening for exposing a section of said saw blade, a second opening in said frame between said first opening and said drive wheel, a prime mover mounted within said second opening and drivingly connected to said drive wheel, a handle for the saw projecting upwardly from said frame above said prime mover, said handle having associated therewith throttle control means for said prime mover to control operation of said saw blade, said prime mover being an internal combustion engine, an arcuate fuel tank for said engine carried by said frame adjacent said handle, said fuel tank following the general contour of said frame and partially enveloping said drive wheel, said prime mover being disposed inwardly of said handle, said fuel tank being disposed outwardly of said handle whereby said fuel tank and fuel contained therein form a counterbalance for said prime mover.

References Cited in the file of this patent

UNITED STATES PATENTS

| | | |
|---|---|---|
| 1,453,335 | Bennett | May 1, 1923 |
| 1,530,682 | Lyman | Mar. 24, 1925 |
| 1,755,067 | Kuenne | Apr. 15, 1930 |
| 1,879,145 | Erickson | Sept. 27, 1932 |
| 2,525,110 | Adair | Oct. 10, 1950 |
| 2,596,081 | Sacrey | May 6, 1952 |
| 2,604,910 | Crosby | July 29, 1952 |